(12) United States Patent
Fischer

(10) Patent No.: US 8,022,834 B2
(45) Date of Patent: Sep. 20, 2011

(54) OCCUPANT DETECTION SYSTEM

(75) Inventor: Thomas Fischer, Wenden (DE)

(73) Assignee: Delphi Technologies, Inc., Troy, MI (US)

( * ) Notice: Subject to any disclaimer, the term of this patent is extended or adjusted under 35 U.S.C. 154(b) by 387 days.

(21) Appl. No.: 12/291,481

(22) Filed: Nov. 10, 2008

(65) Prior Publication Data

US 2009/0128349 A1    May 21, 2009

(30) Foreign Application Priority Data

Nov. 21, 2007 (EP) .................................... 07022600

(51) Int. Cl.
*G08B 21/00* (2006.01)
(52) U.S. Cl. ..................... 340/667; 340/561; 340/825.57
(58) Field of Classification Search .................. 340/667, 340/666, 664–665, 661, 561, 572.1, 5.61, 340/825.57, 902–903
See application file for complete search history.

(56) References Cited

U.S. PATENT DOCUMENTS

| | | | | |
|---|---|---|---|---|
| 4,794,394 A | * | 12/1988 | Halstead | 340/902 |
| 5,293,527 A | * | 3/1994 | Sutton et al. | 340/825.57 |
| 6,456,856 B1 | * | 9/2002 | Werling et al. | 455/575.5 |
| 6,552,649 B1 | * | 4/2003 | Okada et al. | 340/5.61 |
| 6,552,662 B1 | * | 4/2003 | Bomya et al. | 340/572.1 |
| 2003/0060957 A1 | | 3/2003 | Okamura et al. | |
| 2003/0122669 A1 | | 7/2003 | Filippov et al. | |
| 2005/0043875 A1 | * | 2/2005 | Bauer et al. | 701/45 |
| 2005/0128082 A1 | * | 6/2005 | Stanley et al. | 340/561 |

FOREIGN PATENT DOCUMENTS

DE          07022600.6          11/2007

OTHER PUBLICATIONS

EP Search Report dated Jun. 5, 2008.

* cited by examiner

*Primary Examiner* — Daniel Previl
(74) *Attorney, Agent, or Firm* — Jimmy L. Funke

(57) ABSTRACT

An occupant detection system for a vehicle includes an antenna arrangement of a capacitance-based occupant detection device in particular provided beneath the seat surface of a vehicle seat for the generation of a first occupation signal in the event of occupation of the vehicle seat by a person based on a radiation of predetermined minimum strength starting from the antenna arrangement and passing through the person, based on at least one switch arrangement of a weight-based occupant detection device which is provided beneath the seat surface of the vehicle seat and can be actuated in dependence on the pressure acting on it in order to generate a second occupation signal in the event of occupation of the vehicle seat by a person, in particular an adult, as well as a controller that generates an occupation detection signal in the event that both the first occupation signal of the capacitance-based occupant detection device and the second occupation signal of the weight-based occupant detection device are present and which generates an error signal in the event that only the second occupation signal of the weight-based occupant detection device of the two occupation signals is present.

8 Claims, 4 Drawing Sheets

OCCUPANT DETECTION SYSTEM

TECHNICAL FIELD

The invention relates to an occupant detection system for a vehicle having an antenna arrangement of a capacitance-based occupant detection device in particular provided beneath the seat surface of a vehicle seat. It further relates to an antenna and switch arrangement for such an occupant detection system.

BACKGROUND OF THE INVENTION

Capacitance-based occupant detection devices are known and in particular serve for distinguishing between a children's seat located on a vehicle seat and an adult sitting on the vehicle seat. For use in the USA, these occupant detection devices must in particular satisfy the requirements of FMVSS 208 (Federal Motor Vehicle Safety Standard). In this connection, it should in particular be ensured that the airbag or airbags associated with the front passenger seat is/are not triggered in the case of small children at an age of up to one year.

With such a capacitance-based occupant detection device, an antenna, which is arranged beneath the seat surface in the seat cushion and which is operated at an AC voltage with a frequency of 50 kHz, is used to satisfy the named distinguishing function. If a person sits in the vehicle seat, a coupling results between the person and the antenna which has the result that a transmitted radiation moves through the person to the vehicle chassis at which the respective field strength is measured. If a children's seat is located on the vehicle seat or if said vehicle seat is empty, no such coupling arises.

However some problems occur in connection with such capacitance-based occupant detection devices. Such a device is, for instance, not able to distinguish between an empty vehicle seat and an occupied vehicle seat. In addition, the device is also influenced by moisture in an unwanted manner. Water on the vehicle cushion or a damp cushion can thus, for example, effect an appreciable coupling toward the chassis. If a children's seat is located on a wet seat, the classification which is carried out may thus fail.

SUMMARY OF THE INVENTION

According to one aspect of the invention, there is provided an occupant detection system for a vehicle having an antenna arrangement of a capacitance-based occupant detection device, also known as capacity-based occupant detection device, in particular provided under the seat surface of a vehicle seat for the generation of a first occupation signal in the case of occupation of the vehicle seat by a person based on a radiation of presettable or predetermined minimum strength starting from the antenna arrangement and passing through the person, based on at least one switch arrangement of a weight-based occupant detection device which is provided beneath the seat surface of the vehicle seat and can be actuated in dependence on the pressure acting on it in order to generate a second occupation signal in the event of occupation of the vehicle seat by a person, in particular an adult, as well as based on a control and/or evaluation unit, hereafter called a controller, that generates an occupation detection signal in the event that both the first occupation signal of the capacitance-based occupant detection device and the second occupation signal of the weight-based occupant detection device are present and which generates an error signal in the event that only the second occupation signal of the weight-based occupant detection device of the two occupation signals is present.

The problems present in the known capacitance-based occupant detection devices are therefore eliminated in accordance with the invention by the switch arrangement provided in addition to the antenna arrangement.

The controller preferably only generates the occupation confirmation signal when both the first occupation signal of the capacitance-based occupant detection device and the second occupation signal of the weight-based occupant detection device are present.

The controller expediently generates a non-occupation confirmation signal in the event that neither the first occupation signal of the capacitance-based occupant detection device nor the second occupation signal of the weight-based occupant detection device is present.

In this connection, the occupant detection system is preferably configured such that the controller only generates the non-occupation confirmation signal when neither the first occupation signal of the capacitance-based occupant detection device nor the second occupation signal of the weight-based occupant detection device is present.

It is also in particular of advantage if the controller in particular triggers an auto-zero cycle, also known as a teach-in cycle, for the non-occupied vehicle seat serving for the adjustment of the capacitance-based occupant detection device in the event that neither the first occupation signal of the capacitance-based occupant detection device nor the second occupation signal of the weight-based device is present.

In accordance with an expedient practical embodiment of the occupant detection system in accordance with the invention, the antenna arrangement is deactivated via the controller in the event that neither the first occupation signal of the capacitance-based occupant detection device nor the second occupation signal of the weight-based occupant detection device is present.

In the event that neither the first occupation signal of the capacitance-based occupant detection device nor the second occupation signal of the weight-based occupant detection device is present, the weight-based occupant detection device can remain activated for the monitoring of the state of the switch arrangement.

The switch arrangement is preferably integrated in the antenna arrangement.

The antenna arrangement expediently includes a plurality of antennas.

The switch arrangement can expediently include a plurality of switches.

In accordance with a preferred practical embodiment, the antenna arrangement and/or the switch arrangement is/are designed in the form of a flexible printed circuit, with the switch arrangement being integrated in the antenna arrangement. The switch or switches of the switch arrangement can therefore in particular be provided as membrane switches.

The two contacts of a respective switch of the switch arrangement are preferably formed by defined sections of two adjacent antennas of the antenna arrangement. In this connection, the contacts of a plurality of switches of the switch arrangement can be formed by defined sections of a respective antenna pair.

A respective antenna of the antenna arrangement is preferably formed by a copper layer. In this connection, the antenna arrangement can include a plurality of antennas, each formed by a copper layer and each being provided with an insulating layer. Mutually adjacent antennas provided with insulating layers can each be mechanically connected to one another via an adhesive tape.

It is in particular also of advantage if a respective switch of the switch arrangement designed in the form of a flexible printed circuit includes two electrical contacts preferably formed by antenna sections, said contacts being separated from one another at the marginal side by at least one spacer, which is in particular flexible, and with at least one of the contacts being able to be pressed toward the respective other contact on a corresponding exertion of pressure.

In this connection, a respective insulating layer in particular made of PET (polyethylene terephthalate) can be applied, in particular adhesively bonded, to the electrical contacts at the outside.

The spacer is preferably adhesively bonded to the two electrical contacts.

It is in particular also of advantage for the spacer to include an insulating tape.

The spacer can have a laminate between the insulating tape and the two electrical contacts respectively. In this connection, the laminates are each expediently adhesively bonded to the insulating tape and to the respective electrical contact.

The problems which occur with the previously customary capacitance-based occupant detection devices are therefore eliminated in that switches are associated with the antenna structure. Such switches, which can in particular be configured to satisfy a belt warning function, deliver information on whether the vehicle seat is empty or is occupied by an adult. The signal delivered by the switch can accordingly be used to determine whether the vehicle seat is empty or not.

If the switches deliver the information that the vehicle seat is empty and if it is signaled by the capacitance-based occupant detection device that the vehicle seat is empty, the transmission of radiation can be deactivated or stopped and only the switches can be monitored. In addition, the seat status can be set to "empty seat" and an empty state auto-zero cycle can be carried out for the signal strength of the received radiation.

If the switches provide information that the vehicle seat is empty and if the capacitance-based occupant detection signal signals that the vehicle seat is occupied, there is a contradiction between the signals (e.g. empty seat, antenna short-circuited with respect to the chassis, Isofix seat). An error can accordingly be present and the system can change into an error protection mode.

The switch structure can be based on the technology of a flexible printed circuit (FPC), with the same material advantageously being able to be used as for the antenna arrangement itself so that the additional manufacturing effort is minimal and the manufacturing costs remain correspondingly low.

The antenna and switch arrangement in accordance with the invention is characterized in that it is designed in the form of a flexible printed circuit in which the switch arrangement is integrated in the antenna arrangement.

BRIEF DESCRIPTION OF THE DRAWINGS

The invention will be explained in more detail in the following with reference to embodiments and to the drawing; there are shown in this.

DESCRIPTION OF THE PREFERRED EMBODIMENT

Figure 1:
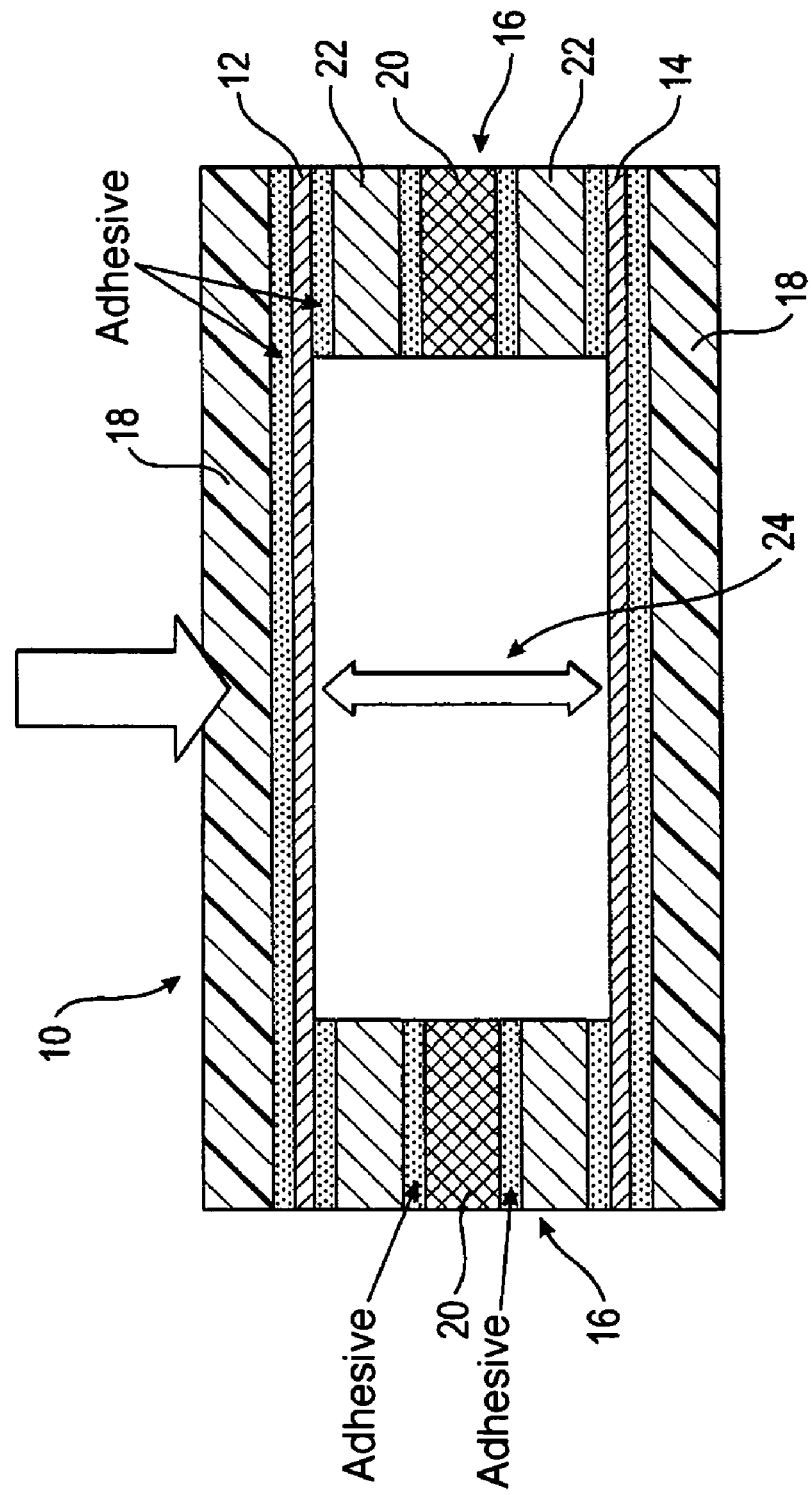
FIG. 1 is a schematic cross-sectional representation of an exemplary embodiment of a switch of a switch arrangement which can be used in the occupant detection system in accordance with the invention.

FIG. 1 shows an exemplary embodiment of a switch 10 of a switch arrangement which can be used in the occupant detection system in accordance with the invention in a schematic cross-sectional representation.

The switch 10 designed in the form of a flexible printed circuit (FPC) includes two electrical contacts 12, 14 which are preferably formed by antenna sections and which are separate from one another at the marginal side by at least one spacer 16 which is in particular flexible. In this connection, at least one of the contacts 12, 14 can be pressed in toward the respective other contact on a corresponding exertion of pressure.

An insulating layer 18, in particular made of PET, can in each case be applied, in particular adhesively bonded, to the electrical contacts 12, 14 at the outside.

The spacer 16 can be adhesively bonded to the two electrical contacts 12, 14.

In addition, the spacer 16 includes an insulating tape 20. The spacer 16 can respectively have a laminate 22 between the insulating tape 20 and the two electrical contacts 12, 14.

The laminates 22 can each be adhesively bonded to the insulating tape 20 and the respective contact 12 and 14 respectively.

The two electrical contacts 12, 14 can come into contact with one another in the contact region 24 by a corresponding exertion of pressure.

Figure 2:
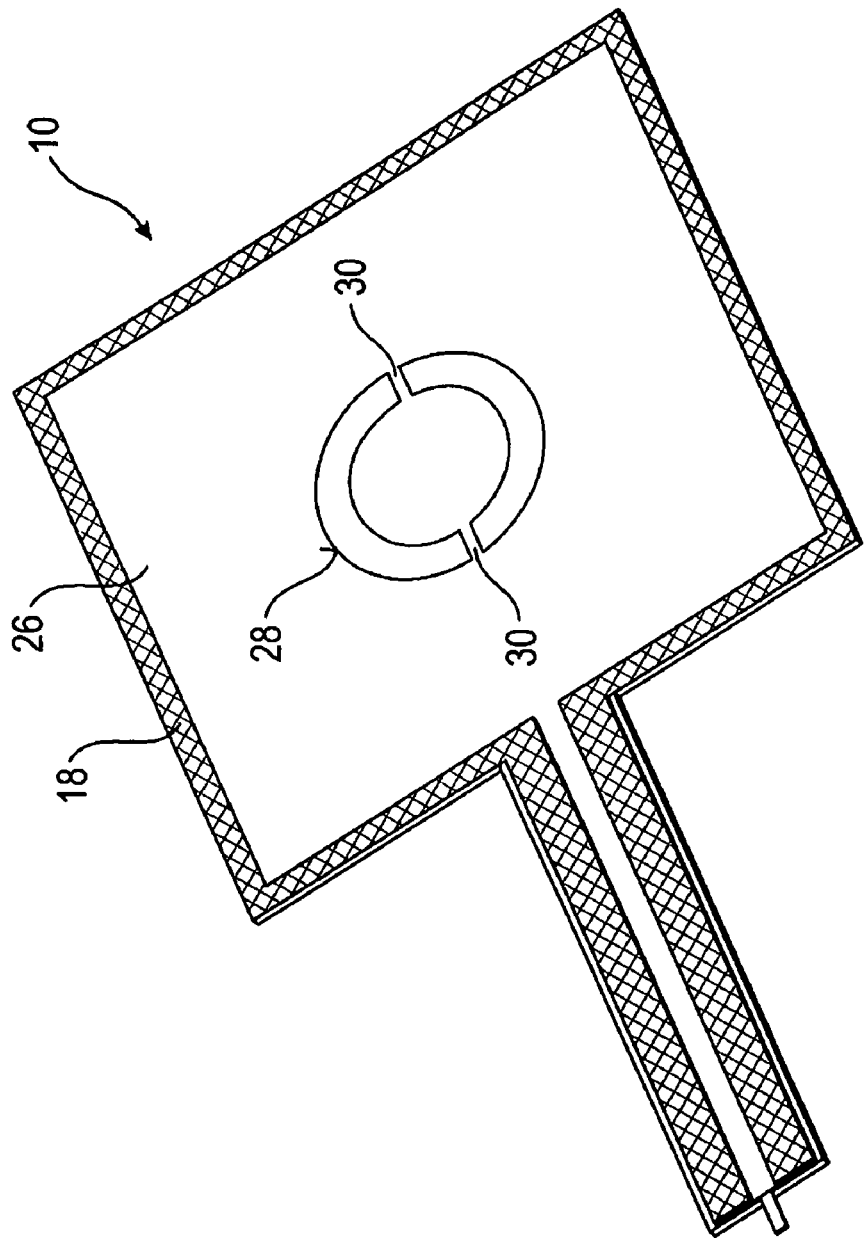
FIG. 2 is a schematic plan view of the switch in accordance with FIG. 1.

FIG. 2 shows a schematic plan view of the switch 10 in accordance with FIG. 1. A copper layer 26 forming at least one antenna as well as at least one switch contact, an insulating layer 18 in particular made of PET, the outer contour 28 of the switch as well as electrical connection points 30 can be recognized in this FIG. 2.

One or more such switches 10 can form a switch arrangement of a weight-based occupant detection device which is in particular to be arranged under the seat surface of the vehicle seat. In this connection, the switches 10 can be actuated by the pressure acting on it.

The switch arrangement can be combined with an antenna arrangement of a capacitance-based occupant detection device likewise provided beneath the seat surface of the vehicle seat, with the switch arrangement preferably being integrated in the antenna arrangement. The antenna arrangement can generally include one or more antennas.

The antenna arrangement and/or the switch arrangement can in particular be designed in the form of a flexible printed circuit. In this connection, the antenna arrangement and the switch arrangement can in particular be realized in one and the same flexible switching membrane. The switches of the switch arrangement can therefore in this case in particular be designed as membrane switches.

The two electrical contacts of a respective switch 10 of the switch arrangement can be formed by defined sections of two adjacent antennas of the antenna arrangement. In this connection, the contacts of a plurality of switches 10 of the switch arrangement can be formed by defined sections of a respective antenna pair.

A respective antenna of the antenna arrangement can in particular be formed by a copper layer.

The capacitance-based occupant detection device including the antenna arrangement can in particular be designed such that a first occupation signal is generated in the event of an occupation of the vehicle seat by a person based on a radiation of a predetermined minimum strength starting from the antenna arrangement and passing through the person. In particular to take account of the regulations applicable in the USA, this capacitance-based occupant detection device can be configured such that small children up to 1 year of age are not detected. It is thereby ensured that the respective airbag is not triggered.

The weight-based occupant detection device delivering the further information and including the switch arrangement is expediently designed such that a second occupation signal is generated in the event of an occupation of the vehicle seat by a person, in particular an adult.

In addition, a controller can be provided which is designed such that an occupation confirmation signal is generated in the event that both the first occupation signal of the capacitance-based occupant detection device and the second occupation signal of the weight-based occupant detection device are present and such that an error signal is generated in the event that only the second occupation signal of the weight-based occupant detection device of the two occupation signals is present.

In this connection, the controller can in particular also be designed such that the occupation confirmation signal is only generated when both the first occupation signal of the capacitance-based occupant detection device and the second occupation signal of the weight-based occupant detection device are present.

The controller is expediently designed such that a non-occupation confirmation signal is generated in the event that neither the first occupation signal of the capacitance-based occupant detection device nor the second occupation signal of the weight-based occupant detection device is present. The controller preferably only generates the non-occupation confirmation signal when neither the first occupation signal of the capacitance-based occupant detection device nor the second occupation signal of the weight-based occupant detection device is present.

Furthermore, the controller can in particular also be designed such that it triggers an auto-zero cycle for the non-occupied vehicle seat serving for the adjustment of the capacitance-based occupant detection device in the event that neither the first occupation signal of the capacitance-based occupant detection device nor the second occupation signal of the weight-based occupant detection device is present.

The antenna arrangement can be deactivated via the controller in the event that neither the first occupation signal of the capacitance-based occupant detection device nor the second occupation signal of the weight-based occupant detection device is present.

If neither the first occupation signal of the capacitance-based occupant detection device nor the second occupation signal of the weight-based occupant detection device is present, the weight-based occupant detection device can remain activated for the monitoring of the state of the switch arrangement.

This occupant detection system including both a capacitance-based occupant detection device and a weight-based occupant detection device can in particular be used for the increase of the efficiency of the protection by the airbag, for example due to a smart use or a holding back in particular of the front passenger airbag. Using corresponding algorithms for the occupant classification and using a corresponding signal processing, an airbag-controller is put in a position to use or hold back the front passenger airbag more variably, for example. The system can measure the load on the vehicle seat by the occupant, classify the occupant based on his weight, and pass on the information to the airbag-controller based on the occupant characteristics, which is a substantial factor in deciding whether and to what extent the airbag should be used. In this connection, safety and reliability are considerably increased by the combination of the capacitance-based detection device with the weight-based occupant detection device. Since the switch arrangement of the weight-based occupant detection is integrated in the antenna arrangement of the capacitance-based occupant detection device and the antenna arrangement and the switch arrangement are designed in the form of a common flexible printed circuit, the increased effort is minimal, whereby the manufacturing costs are correspondingly minimized.

Figure 3:
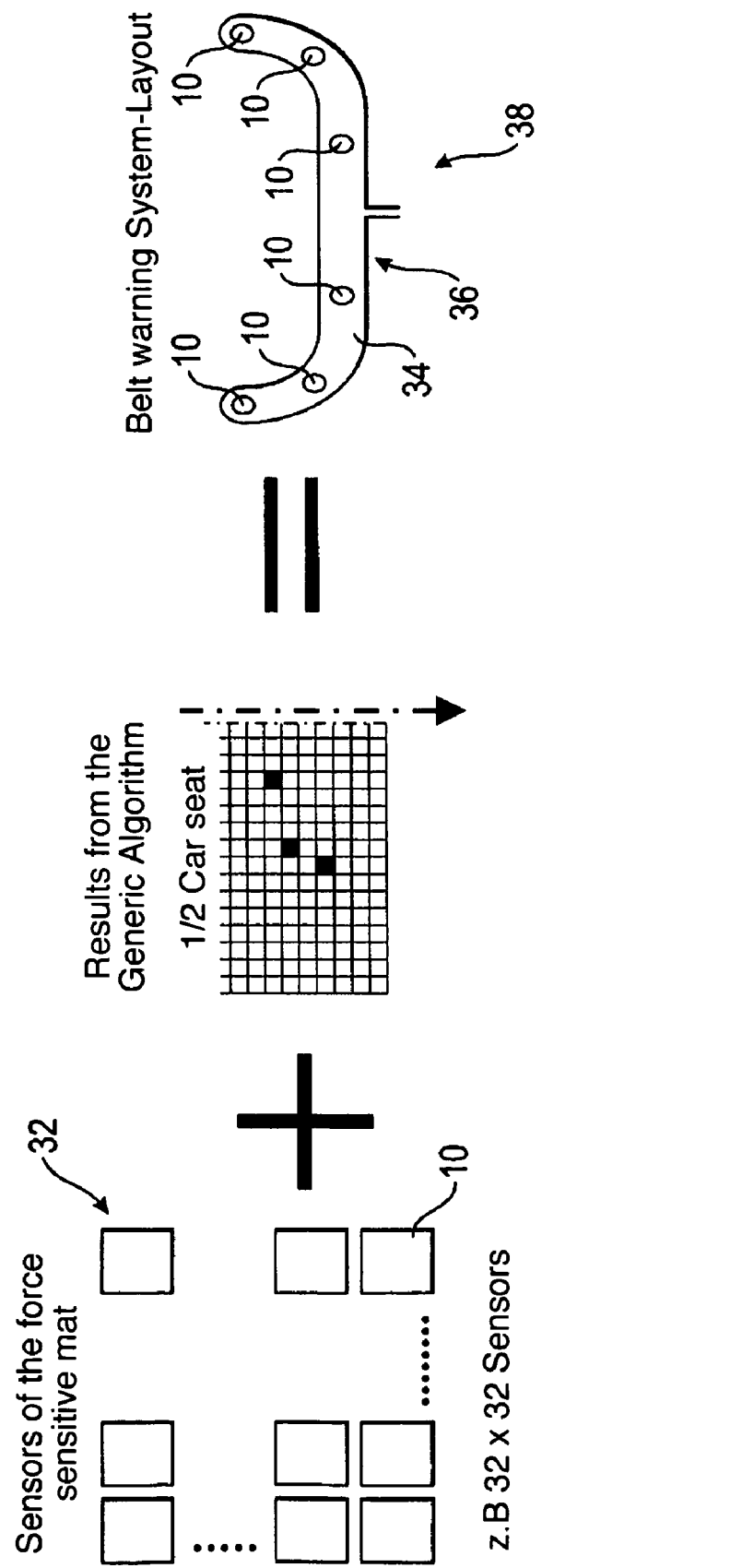
FIG. 3 is a schematic representation of the integration of the switches distributed in accordance with the result of a generic algorithm in the antenna arrangement or the corresponding belt warning layout.

FIG. 3 shows the integration of the switches 10 of the switch arrangement 32 distributed according to the result of a generic algorithm in the antenna arrangement 36 including one or more antennas 34 in a schematic representation.

Then, starting from a switch arrangement 32 including a plurality of pressure-sensitive switches 10, the ideal positions and/or switch number for the combined occupant detection system 38 are determined via a generic algorithm applied to the weight-based data obtained via this switch arrangement 32.

Figure 4:
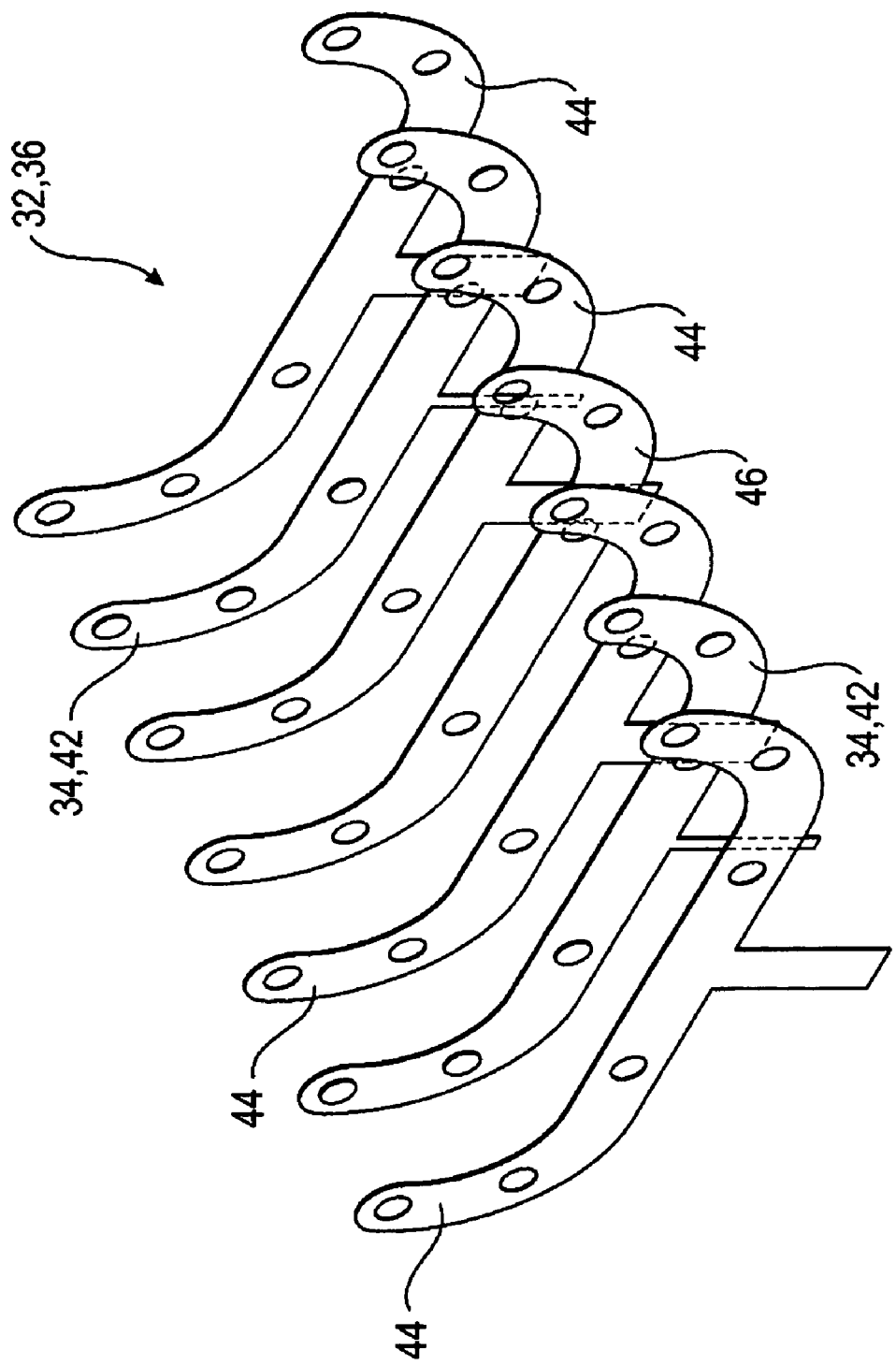
FIG. 4 is a schematic representation of a combined antenna/switch arrangement.

FIG. 4 shows an exemplary embodiment of a combined antenna/switch arrangement 32, 36 of the occupant detection system 38 in a schematic representation.

In this connection, the antenna arrangement 36 can, for example, include a plurality of antennas 34 each formed by a copper layer 42. A respective insulating layer 44 can be provided between the antennas 34. Mutually adjacent antennas 34 provided with insulating layers 44 can each be mechanically connected to one another via an adhesive tape 46.

I claim:

1. An occupant detection system for a vehicle, said vehicle comprising a vehicle seat having a seat surface, said occupant detection system comprising:
    a capacitance-based occupant detection device adapted to generate a first occupation signal in response to occupation of the vehicle seat by a person, said capacitance-based occupant detection device comprising an antenna disposed under the seat surface;
    a weight-based occupant detection device adapted to generate a second occupation signal in response to occupation of the vehicle seat by a person, said weight-based occupant detection device comprising a switch disposed under the seat surface; and
    a controller configured to generate an occupation confirmation signal when both the first occupation signal and the second occupation signal are present, and to generate an error signal when the first occupation signal is not present and the second occupation signal is present, wherein the system comprises an antenna arrangement that includes a first antenna and a second antenna in spaced, parallel relationship, wherein the first antenna is adapted to contact the second antenna in response to occupation of the vehicle seat by the person, thereby forming the switch.

2. A system in accordance with claim 1, wherein the controller is further configured to generate a non-occupation confirmation signal when both the first occupation signal and the second occupation signal are not present.

3. A system in accordance with claim 2, wherein the controller is further configured to trigger an auto-zero cycle when the non-occupation confirmation signal is present.

4. A system in accordance with claim 2, wherein the controller is further configured to deactivate radiation to the antenna when the non-occupation confirmation signal is present.

5. A system in accordance with claim 4, wherein the weight-based occupant detection device remains activated when the controller deactivates the radiation to the antenna.

6. A system in accordance with claim 1, wherein the first antenna is a metallic layer, the second antenna is a metallic layer, the antenna arrangement comprises a flexible insulating layer intermediate the first antenna and the second antenna and defines an opening that forms a contact region whereat the first antenna is adapted to contact the second antenna.

7. A system in accordance with claim 6, wherein the antenna arrangement has a plurality of openings that form a plurality of contact regions for contact between the first antenna and the second antenna.

8. A system in accordance with claim 7, wherein the flexible insulating layer is a first flexible insulating layer, and wherein the antenna arrangement comprises a second flexible insulating layer bonded to the second antenna and a third antenna bonded to the second flexible insulating layer opposite the first flexible insulating layer.

* * * * *